United States Patent [19]

Gherardi et al.

[11] Patent Number: 5,192,112
[45] Date of Patent: Mar. 9, 1993

[54] SAFETY CAPTAIN WINDOW FOR TRUCKS

[76] Inventors: Nicholas Gherardi, 185-1 Black River Rd., Long Valley, N.J. 07853; Sari Steller, R.D. 1 Box 390-3, Upper Black Eddy, Pa. 18972-9605

[21] Appl. No.: 817,504

[22] Filed: Jan. 7, 1992

[51] Int. Cl.⁵ .................... B62D 33/06; E06B 3/00
[52] U.S. Cl. ......................... 296/190; 296/146 R; 296/166; 160/90
[58] Field of Search .............. 296/166, 190, 201, 146; 160/90, 101, 105

[56] References Cited

U.S. PATENT DOCUMENTS

| | | | |
|---|---|---|---|
| 2,619,168 | 11/1952 | Leverence | 160/354 |
| 2,625,217 | 1/1953 | Spiller et al. | 160/90 |
| 2,643,711 | 6/1953 | Smith | 160/105 |
| 2,702,596 | 2/1955 | Morrow | 160/354 |
| 2,704,121 | 3/1955 | Maidhof et al. | 160/216 |
| 2,717,036 | 9/1955 | Harris | 160/354 |
| 2,804,135 | 8/1957 | Sutton | 160/105 |
| 3,753,458 | 8/1973 | Lazarek | 160/354 |
| 4,936,368 | 6/1990 | Philbeck et al. | 160/90 |

FOREIGN PATENT DOCUMENTS 481462 3/1952 Canada ..................... 160/101

Primary Examiner—Robert R. Song
Attorney, Agent, or Firm—Mason, Fenwick & Lawrence

[57] ABSTRACT

A safety captain window for a truck, which comprises: a captain window housing comprising inner, middle, and outer channel members, wherein the inner channel member comprises at least one slidable glass window member slidably movable within the inner channel member, the middle channel member comprises first and second fixed glass plate members fixedly mounted within the middle channel member so as to define an opening therein between the first and second fixed glass plate members, and the outer channel member comprises first and second channel sections separated by a safety screen means, whereby the safety screen means prevents the influx of solid matter through an opening formed when the at least one slidable glass window member is moved in a lateral direction within the inner channel member.

9 Claims, 1 Drawing Sheet

SAFETY CAPTAIN WINDOW FOR TRUCKS

BACKGROUND OF THE INVENTION

1. Field of the Invention

The present invention relates to window structures, and particularly to a safety captain window structure for trucks, such as pickup trucks, which prevents debris and similar solid matter located on the truck bed from ingressing into the passenger cab of the vehicle.

2. Description of the Prior Art

Trucks, such as flatbed or pickup trucks, have for many years been optionally provided with captain windows. A captain window is located at the rear of the truck's passenger cab, directly behind the heads of the driver and passenger. Typically, a captain window opens by means of one or two laterally sliding glass window members, which when opened allow ventilation of the cab with air from the rear of the truck.

When flatbed or pickup trucks are equipped with conventional captain windows, however, a serious problem arises when the truck is driven with the captain window in the open position. Specifically, when the truck is driven as such, light weight solid matter or debris located on the bed of the truck is literally sucked into the cab of the truck, frequently striking the heads of the occupants and otherwise interfering with safe operation of the vehicle. Aluminum cans, hay, dirt, paper and other lightweight sold materials often present on the beds of such trucks are forced into the truck cab at great speeds, when a truck carrying these materials is driven with its captain window in the open position. Also, rainwater enters through an open captain window of conventional design.

The above-described aerodynamic phenomenon was apparently not contemplated by the original designers and manufacturers of captain windows, and to date there remains no acceptable solution to this problem. In fact, a large number of truck owners simply never use their captain windows as a result of the inconvenience and danger caused by the entry of lightweight materials and rainwater into the cab of their truck during operation of the same. In addition, conventional captain windows tend to greatly increase the noise within the truck cab, which further reduces use of conventional captain windows by truck owners.

In the past, automobiles have been provided with screens in order to keep out insects and the like. For example, U.S. Pat. No. 2,619,168, Leverence, discloses a foldable and packagable window screen for a motor vehicle which is said to prevent the admission of insects and dust into the vehicle interior. As illustrated in FIGS. 1-4, screen material 1 is mounted on the adjacent sides of automobile door 3 or the body wall by means of a sheet-like fabric or flexible and foldable composition frame 4, which is permanently joined to the screen material and is provided with adhesive sides 5 that are disposed outwardly and laterally of the marginal portions of the screen material. In this fashion, the screen window is said to be easily removable from the window opening.

U.S Pat. No. 2,625,217, Spiller et al., relates to window screens, and particularly, to a screen for automobile windows. One disclosed function of the screen is to exclude insects from the interior of the automobile. The screen includes a deformable plastic frame 30 which allows the screen to be inserted into the window opening in order to be secured thereto.

U.S. Pat. No. 2,643,711, Smith, illustrates a flexible screen adapted to be removable and conveniently mounted in the window openings of an automobile in order to close such openings against the ingress of flies and other pests, while providing ventilation to the interior of the vehicle. The disclosed structure includes spring coils 20 and 22 which connect the top of the device to the side members and bias these members against the window channel to secure the screen to the vehicle.

U.S. Pat. No. 2,702,596, Morrow, illustrates an automobile window screen which is said to be capable of fitting window openings of different sizes and shapes. As shown in FIG. 2, the window screen 14 is formed of a continuous resilient metal strip which is transversely curved. Adjacent to one end of the strip which comprises border frame 20 is secured an open loop 24, having space therein to permit the opposite end 26 of the strip 20 to be inserted through the loop as shown. By drawing more or less of end 26 of the strip 20 through this loop, the area enclosed by the loop may be varied. An adjustable abutment 27 is secured adjacent to the end 26 of the strip by a set-screw 28.

U.S. Pat. No. 2,704,121, Maidhof et al., discloses a sliding screen for an automobile window that is also said to be adapted to fit different automobiles and different shaped window openings. Modification for windows having various forward contours or inclinations is provided by cutting or trimming the end of one of the slide screens, or by the pivotal adjustment of an auxiliary sheet to give the screen an inclined attaching edge beyond its regular straight edge.

U.S. Pat. No. 2,717,036, Harris, discloses an automobile window screen for keeping out mosquitos and other insects which consists of a flexible mosquito netting 16 having a flexible elastic cord 17 hemmed into the upper edge 18 and the side edges (19, 20) of the screen. Four magnets (22-25) are provided near the juncture of the bottom and sides, and near the center of the screen, for purposes of securing the screen to the automobile.

U.S. Pat. No. 2,804,135, Sutton, illustrates a screen for an automobile window that is designed to remain stable whether the car is stationary or in operation, and which is said to be capable of being folded and rolled into a small package of such size that it may be stored in the glove compartment of the automobile. The screen appears to be secured in position by means of a plurality of clips (6a-6g).

U.S. Pat. No. 3,753,458, Lazarek, is directed to a demountable car window screen which is secured to the automobile by means of Velcro strips mounted around the periphery of the screen.

The foregoing efforts do not provide an acceptable solution to the difficulties encountered with the use of captain windows. For example, the above-described screens which use magnets as a securing means cannot be satisfactorily secured to captain windows, and as such are easily jarred out of place. The detachable automobile screen structures discussed above do not satisfactorily prevent the ingress of lightweight materials, nor are such structures adapted for modification depending upon the type of materials to be transported in the truck bed. In addition, many of the automobile screen designs disclosed in the prior art are too complex and/or aesthetically unattractive to present a commercially viable solution to the problems associated with truck captain windows.

SUMMARY OF THE INVENTION

Accordingly, Applicants have developed a captain window for trucks which overcomes the shortcomings of conventional captain window configurations. Thus, according to one aspect of the invention, Applicants provide a safety captain window for a truck, which comprises: a captain window housing comprising inner, middle, and outer channel members, wherein said inner channel member comprises at least one slidable glass window member slidably movable within said inner channel member, said middle channel member comprises first and second fixed glass plate members fixedly mounted within said middle channel member so as to define an opening therein between said first and second fixed glass plate members, and said outer channel member comprises first and second channel sections separated by a safety screen means, whereby said safety screen means prevents the influx of solid matter through an opening formed when said at least one slidable glass window member is moved in a lateral direction within said inner channel member.

According to a second aspect of the invention, Applicants provide a safety captain window for a truck, which comprises: a captain window housing comprising inner, middle, and outer channel members, wherein said inner channel member comprises at least one slidable glass window member slidably movable within said inner channel member, said middle channel member comprises first and second fixed glass plate members fixedly mounted on opposite sides of a safety screen means located within said middle channel member, and said outer channel member comprises first and second channel sections defining an opening therebetween, whereby said safety screen means prevents the influx of solid matter through an opening formed when said at least one slidable glass window member is moved in lateral direction within said inner channel member.

According to a third aspect of the invention, Applicants provide a safety captain window for a truck, which comprises: a captain window housing comprising inner, middle, and outer channel members, wherein said inner channel member comprises a safety screen means secured in place within said inner channel member by at least one slidable glass window member, said at least one slidable glass window member being slidably movable within said inner channel member, said middle channel member comprises first and second fixed glass plate members fixedly mounted within said middle channel member and defining an opening therebetween, and said outer channel member comprises first and second channel sections defining an opening therebetween, whereby said safety screen means prevents the influx of solid matter through said safety captain window.

The present invention therefore contemplates that the safety screen means may be situated in either the inner, middle or outer channel members of the captain window housing. In addition, a second and/or third safety screen means may be provided in the inner, middle or outer channel members. The concurrent use of two or more safety screen means has been found to provide further improved results, particularly when screens having different mesh sizes are employed. In this regard, the channel members of the captain window housing may be formed having the same channel width, such that the one or more safety screen means may be interchanged in various locations within the captain window housing.

The safety screen means which forms an integral part of the present invention may be constructed of any suitable material known in the art. For example, the screen may be made of metals such as aluminum or stainless steel, or polymeric materials such as plastics. Screen mesh sizes of from about 10 to about 400 U.S. standard sieve size have been found to provide preferred results, depending upon the type of lightweight solid materials carried in the truck bed. The screen means may be painted with various colors or designs to provide an aesthetically pleasing commercial product The captain window housing is preferably configured so that the safety screen means may be easily removed therefrom. In this regard, providing the safety screen means with handles on the lateral sides of the screen has been found to facilitate installation and removal of the safety screen means from the subject captain window.

The present invention also provides a method of preventing the influx of solid matter into the interior of a truck, which comprises outfitting said truck with a safety captain window which comprises: a captain window housing comprising inner, middle, and outer channel members, wherein said inner channel member comprises at least one slidable glass window member slidably movable within said inner channel member and being capable of forming an opening therein, said middle channel member comprises first and second fixed glass plate members defining an opening therebetween, and said outer channel member comprises first and second channel sections defining an opening therebetween, wherein at least one safety screen means is located in at least one of said openings defined in said inner, middle, and outer channel members so as to prevent the influx of solid matter into the interior of said truck.

All of the captain window configurations provided by the instant invention enable the sliding glass window portion thereof to be opened during operation of the truck without the ingress of solid matter, such as lightweight debris or rainwater, into the truck cab. When a truck having a captain window of the invention is driven with the captain window in the open position, solid materials which are propelled by aerodynamic forces towards the truck cab are simply deflected by the captain window's safety screen means and thereby prevented from entering the passenger cab. After deflection, these airborne materials fall harmlessly back into the truck bed where they remain during operation of the vehicle. In addition, the captain window of the invention provides an unexpected significant reduction of noise within the truck cab, when the window is opened during operation of the vehicle.

As previously described, the truck operator may select and interchange safety screen means having different screen mesh sizes depending upon the type of material to be carried in the bed of the truck. Also, combinations of two or more safety screens may be employed in the captain window of the invention to maximize the efficiency of the device.

DESCRIPTION OF THE PREFERRED EMBODIMENTS

The present invention will now be described in detail with reference to a preferred embodiment, which is merely intended to further illustrate the subject invention and is not deemed to be limiting thereof.

Figure 1:
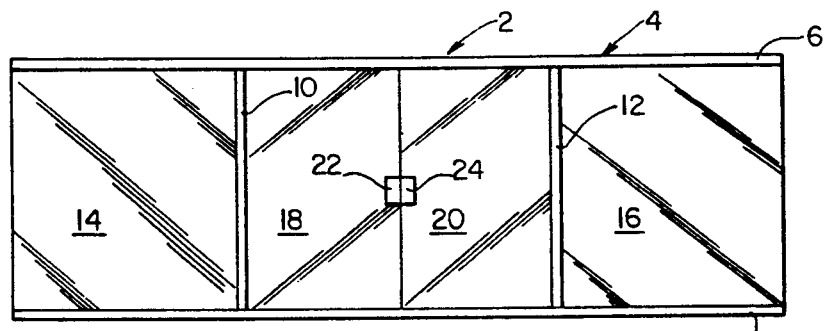
FIG. 1 is a front elevation view of the safety captain window provided by the present invention.

Referring to FIG. 1, there is illustrated a front elevation view of safety captain window as provided by the instant invention. The FIG. 1 perspective is taken from the inside of the passenger cab of a truck equipped with the inventive captain window. As shown in FIG. I, the safety captain window 2 includes a captain window housing 4 which houses tracks (6,8) as well as fixed window frames (10,12).

Housing 4 supports first and second fixed glass plate members (14,16), and first and second slidable glass window members (18,20) which allow the captain window to be opened and closed by means of lateral displacement of handles (22,24) affixed to the front of slidable glass window members (18,20).

Optionally, a single slidable glass window (not shown) may be substituted for the double window configuration illustrated in FIG. 1.

Figure 2:
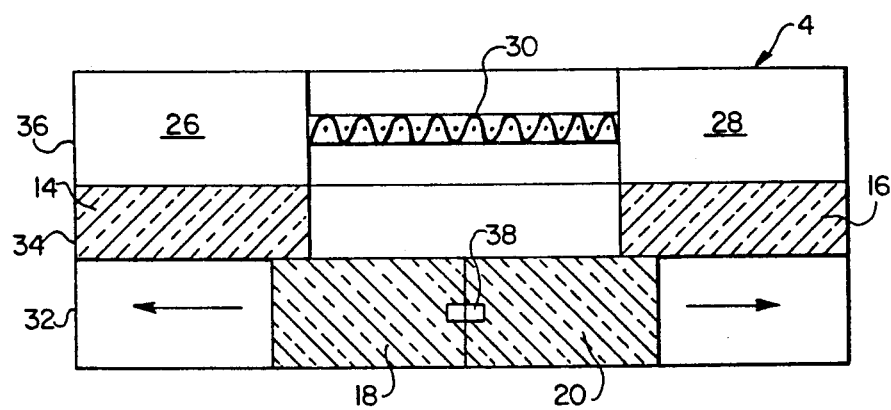
FIG. 2 is a top cross-sectional view of the safety captain window of the invention.

Referring now to FIG. 2, a top cross-sectional of the captain window of the invention is shown. Captain window housing 4 supports slidable glass window members (18,20) and fixed glass plate members (14,16) as described and illustrated above with regard to FIG. 1. In addition, housing 4 supports first and second channel sections (26,28) and safety screen means 30. Channel sections (26,28) may comprise rubber-filled J-channels or similar structures well-known in the art.

As further shown in FIG. 2, captain window housing 4 includes an inner channel member 32, middle channel member 34, and outer channel member 36. The channel members are disposed in parallel relation within housing 4. Inner channel member 32 is proximate the truck cab and outer channel member 36 is nearest the truck bed, when the captain window of the invention is installed into a truck.

As illustrated in FIG. 2, inner channel member 32 houses first and second slidable glass window members (18,20); middle channel 34 houses first and second fixed glass plate members (14,16); and outer channel member 36 houses first and second channel sections (26,28) as well as safety screen means 30. An opening is defined between first and second fixed glass plate members (14,16). In addition, an opening is defined between first and second slidable glass window members (18,20) when these window members are separated from each other in opposite lateral directions. When window members (18,20) are separated as far as possible, the opening defined therebetween corresponds with the width of the opening between first and second immovable glass plate members (14,16) in middle channel member 34, as well as corresponding to the width of safety screen means 30. It will therefore be understood that opening of first and second slidable glass window members (18,20) creates an opening through which air from the back of the truck may pass through safety screen means 30 and into the truck interior. First and second slidable glass window members (18,20) may include a suitable lock 38 to prevent undesired opening of the window members.

Figure 3:
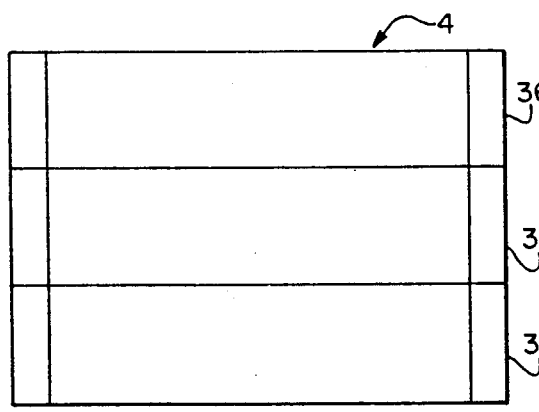
FIG. 3 is a bottom cross-sectional view of the safety captain window of the invention, showing the arrangement of the inner, middle and outer channel members within the captain window housing.

Referring now to FIG. 3, there is illustrated a bottom cross-sectional view of the captain window housing 4 provided by the invention. Inner, middle and outer channel members (32,34,36) described previously may be constructed so as to have the same channel width, thereby enabling safety screen means 30 to be easily interchanged between inner, middle, and outer channel locations. Also, as described above, multiple screen means may be employed, with different mesh sizes if desired, in order to further enhance the utility of the subject captain window under varying payload and operating conditions. For example, when dirt, sand or the like is being transported in the bed of the truck, one or more safety screens having a mesh size of 250-350 U.S. standard sieve size has been found to provide acceptable results. This size screen is also suitable for preventing the ingress of rainwater into the truck cab. For straw or hay, a mesh size of about 150 U.S. standard sieve size is suitable. For larger objects, such as aluminum cans and the like, a single safety screen having a mesh size of about 25-100 U.S. standard may be employed.

Figure 4:
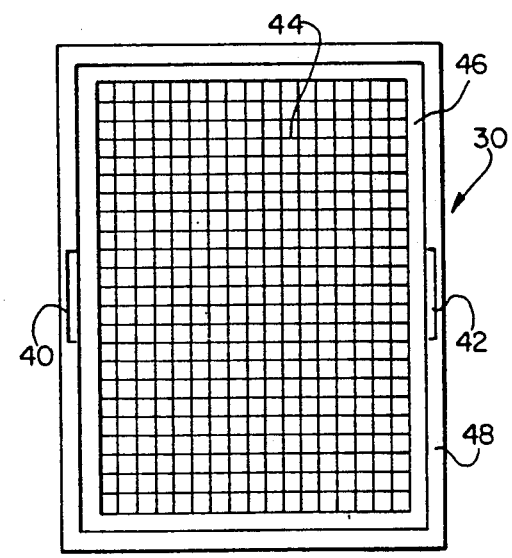
FIG. 4 is a front plan view of the safety screen means utilized in the safety captain window of the invention.

FIG. 4 illustrates a typical safety screen means 30 having handles (40,42) to facilitate installation and removal of the safety screen from the inventive captain window structure. The safety screen means is vertically removable from captain window housing 4 by simply reaching into the housing and pulling up on handles (40,42) to release the safety screen means 30 from the captain window; the safety screen 30 is lifted out through the top of the captain window housing.

As further depicted in FIG. 4, safety screen means 30 includes a screen portion 44, which is held in place on frame 48 by rubber welting 46. As indicated previously, screen portion 44 may be constructed of metal, polymeric compounds such as plastic, or any other suitable materials well-known in the art.

The invention being this described, it will be obvious that the same may be varied in many ways. Such variations are not to be regarded as a departure from the spirit and scope of the invention and all such modifications are intended to be included within the scope of the following claims.

What is claimed is:

1. A safety captain window for a truck, which comprises: a captain window housing comprising inner, middle, and outer channel member of same channel width, wherein said inner channel member comprises at least one slidable glass window member slidably movable within said inner channel member, said middle channel member comprises first and second fixed glass plate members fixedly mounted within said middle channel member so as to define an opening therein between said first and second fixed glass plate members, and said outer channel member comprises first and second immovable channel sections wherein said inner, middle or outer channel members is separated by a safety screen means, whereby said safety screen means prevents the influx of solid matter through an opening formed when said at least on slidable glass window member is moved in a lateral direction within said inner channel member.

2. The safety captain window of claim 1, wherein said safety screen means comprises a screen having a mesh size of from about 10 to about 400 U.S. standard sieve size.

3. The safety captain window of claim 2, wherein said safety screen means is made of metal or polymeric material.

4. The safety captain window of claim 1, wherein said safety screen means is vertically removable from said outer channel member of said safety captain window.

5. The safety captain window of claim 4, wherein said safety screen means has handles on opposite sides of said safety screen means, to facilitate installation and removal of said safety screen means from said safety captain window.

6. The safety captain window of claim 1, wherein a second safety screen means is located in an opening defined within said inner or middle channel members.

7. The safety captain window of claim 6, wherein said second safety screen means comprises a screen having a different mesh size than that of said first safety screen means.

8. The safety captain window of claim 1, incorporated into a pickup truck structure, such that said at least one slidable glass window member associated with said inner channel member is proximate to the interior of the passenger cab of said pickup truck, and said safety screen device associated with said outer channel member is proximate to the bed of said pickup truck.

9. A method of preventing the influx of solid matter into the interior of a truck, which comprises outfitting said truck with a safety captain window which comprises: a captain window housing comprising inner, middle, and outer channel members of same channel width, wherein said inner channel member comprises at least one slidable glass window member slidably movable within said inner channel member and being capable of forming an opening therein, said middle channel member comprises first and second fixed glass plate members defining an opening therebetween, and said outer channel member comprises first and second channel sections defining an opening therebetween, wherein at least one safety screen means is located in at least one of said openings defined in said inner, middle, and outer channel members so as to prevent the influx of solid matter into the interior of said truck.

* * * * *